US005964293A

United States Patent [19]
Chatterji et al.

[11] Patent Number: 5,964,293
[45] Date of Patent: Oct. 12, 1999

[54] WELL COMPLETION METHODS USING RUBBER LATEX COMPOSITIONS IN SUBTERRANEAN FORMATIONS CONTAINING SALT ZONES

[75] Inventors: Jiten Chatterji, Duncan, Okla.; James F. Heathman, Katy, Tex.; Bobby J. King, Duncan, Okla.

[73] Assignee: Halliburton Energy Services, Inc., Duncan, Okla.

[21] Appl. No.: 08/937,546

[22] Filed: Sep. 25, 1997

[51] Int. Cl.$^6$ ...................................................... E21B 33/13
[52] U.S. Cl. .............................................. 166/294; 166/285
[58] Field of Search ...................................... 166/291, 294, 166/295, 285, 292; 175/65, 72

[56] References Cited

U.S. PATENT DOCUMENTS

| | | | |
|---|---|---|---|
| 5,159,980 | 11/1992 | Onan et al. | 166/294 |
| 5,181,568 | 1/1993 | McKown et al. | 166/293 |
| 5,309,999 | 5/1994 | Cowan et al. | 166/293 |

OTHER PUBLICATIONS

Nelson, Erik B., textbook entitled "Well Cementing," Chapter 7, Special Cement Systems, pp. 7–8 and 7–9 (1990).
Halliburton Flo–Chek™ Process Brochure identified as Brochure C–1253 (Rev.).
Ludwig, N.C., "Effects of Sodium Chloride On Setting Properties of Oil–Well Cements," presented at the spring meeting of the Mid–Continent District, Division of Production, Amarillo, Texas, Mar. 1951.
Nester, J.H., et al, "Resistances to Failure of Oil–Well Casing Subjected to Non–Uniform Transverse Loading," Drilling and Production Practices, 1955, pp. 374–378.
Slagle, Knox A. et al, "Salt Cement For Shale and Bentonitic Sands," Journal of Petroleum Technology, Feb. 1963.
Cheatham, J.B. et al, "Behavior of Casing Subjected to Salt Lodging," Journal of Petroleum Technology, Sep. 1964.
Cunningham, Willis et al, "Effect of Salt Cement Filtrate on Subsurface Formations," presented at SPE 42nd Annual Fall Meeting, Houston, Texas, Oct. 1–4, 1967.
Chesnut, D.A. et al, "A Model for Events Occurring at Random Points in Time and an Example Application to Casing Failures in Cedar Creek Anticline Wells," Society of Petroleum Engineers, Oct. 1974, pp. 482–490.
Clegg, J.D., "Casing Failure Study—Cedar Creek Anticline," SPE Paper 3046 prepared for the 45th Annual Fall Meeting of the Society Engineers of Petroleum of AIME, held in Houston, Texas, Oct. 4–7, 1970.
Morris, C.A., "Cost–of–Risk Analysis of Well Repairs Pay Off for Shell," Oil and Gas Journal, Dec. 15, 1969, pp. 70–73.
"Williston Basin: Salt Section Poses Problems," World Oil, May 1981, pp. 95–98.
Burkowsky, M. et al, "Cemented Pipe–In–Pipe Casing Strings Solve Field Problems," World Oil, Oct. 1981.

Pattillo, P.D. et al, "How Amoco Solved Casing Design Problems In The Gulf of Suez," Petroleum Engineer International, Nov. 1981.
Moore, Steven D. et al, "Shell Pushes Ahead in the Williston Basin," Petroleum Engineer Int'l, Nov. 1982.
Sheffield, J.S. et al, "Salt Drilling in the Rocky Mountains," IADC/SPE Paper 11374 presented at the IADC/SPE 1983 Drilling Conference held in New Orleans, Louisiana, Feb. 20–23.
Godwin, Korwin et al, "Salt–Free Cement—An Alternative To Collapsed Casing In Plastic Salts," Journal of Petroleum Technology, Feb. 1984.
Bryant, G.A. et al, "Successful Alternatives to Conventional Cement Designs in the Williston Basin," SPE Paper 12904 presented at the 1984 Rocky Mountain Regional Meeting held in Casper, Wyoming, May 21–23.
Rike, E.A. Jr, "Success in Prevention of Casing Failures Opposite Salts, Little Knife Field, N.D.," SPE Paper 12903 presented at the 1984 Rocky Mountain Regional Meeting held in Casper, Wyoming, May 21–23.
Holt, C.A. et al, "A Method for Drilling Moving Salt Formations: Drilling and Underreaming at the Same Time," SPE/IADC Paper 13488 presented at the SPE/IADC 1985 Drilling Conference held in New Orleans, Louisiana, Mar. 6–8.
Hackney, R.M., "A New Approach to Casing Design for Salt Formations," SPE/IADC Paper 13431 presented at the SPE/IADC 1985 Drilling Conference held in New Orleans, Louisiana, Mar. 6–8.
Marx, C. et al, "Evaluation of Collapse Strength of Cemented Pipe–In–Pipe Casing Stringes," SPE/IADC Paper 13432 presented at the SPE/IADC 1985 Drilling Conference held in New Orleans, Louisiana, Mar. 6–8.
Rike, E.A. et al, "Success in Prevention of Casing Failures Opposite Salts, Little Knife Field, N.D.," SPE Drilling Engineer, Apr. 1986.
George, Charles et al, "Cementing Techniques For Solution Mining Wells and Salt Storage Domes: State of the Art," May 1985.
El–Sayed, A.A.H. et al, "Effect of Internal Pressure and Cement Strength on the Resistance of Concentric Casing Strings," presented at 1987 SPE Middle East Oil Show, Mar. 7–10.
Halliburton Salt Water Cement Brochure which is admitted to be prior art.

*Primary Examiner*—William Neuder
*Assistant Examiner*—Zakiya Walker
*Attorney, Agent, or Firm*—Craig W. Roddy

[57] ABSTRACT

Well completion methods using an aqueous polymer composition such as rubber latex in a subterranean formation containing a salt zone. The composition is used to form a protective layer on the salt zone. The layer is substantially impermeable to fluids and prevents them from contacting the salt zone and creating a washed-out area therein. Further, the layer enables a freshwater cement slurry to be used in the well completion operations through the salt zone.

24 Claims, No Drawings

WELL COMPLETION METHODS USING RUBBER LATEX COMPOSITIONS IN SUBTERRANEAN FORMATIONS CONTAINING SALT ZONES

BACKGROUND OF THE INVENTION

The present invention relates generally to oil and gas well completion methods, and more particularly, to well completion methods utilizing rubber latex compositions in subterranean formations containing salt zones.

A variety of oil and gas well completion methods have heretofore involved the use of hydraulic cement compositions. Such cement compositions are usually comprised of a water slurry of Portland cement and various additives such as set time accelerators, retarders, fluid loss reducers, dispersants, etc. The cement slurries are pumped into completion or remedial locations within well bores and/or subterranean formations penetrated thereby and allowed to set into hard impermeable masses.

A principal well completion technique which utilizes a cement composition is known as primary well cementing. Primary well cementing involves the placement of a cement composition in the annulus between the walls of the well bore and a conduit, e.g., casing, disposed therein, and allowing the cement composition to set therein whereby the exterior surfaces of the conduit are bonded to the walls of the well bore. The bonding of the conduit within the well bore serves to maintain the conduit in place and to prevent formation fluids from communicating between subterranean formations or zones or to the surface by way of the annulus.

While primary cementing operations utilizing Portland cement compositions have generally been very successful, when such primary cementing is carried out in wells through salt zones wash-out areas in the formation can occur as a result of salt dissolution into non-salt saturated aqueous well bore fluid. Salt zones can also have adverse effects on freshwater cement compositions used in well completion methods, and therefore, salt saturated slurries are often necessary for cementing through these zones. However, the use of a salt saturated cement slurry is often undesired because the salt increases the length of time required for the cement to set. Hence, there are needs for improved well completion methods utilizing compositions which provide protective barriers between the salt zones and fluids being used in such methods.

SUMMARY OF THE INVENTION

By the present invention, improved well completion methods are provided which meet the needs recited above. Preferred methods comprise drilling a well bore in a subterranean formation containing a salt zone using a salt saturated drilling fluid, placing an aqueous polymer composition in the well bore or in formations penetrated by the well bore, contacting the composition with the salt zone, allowing the composition to react and form a layer on the salt zone wherein the layer is substantially impermeable to water-based fluids, placing a hydraulic cementitious material in the well bore between casing placed therein and the set layer for permanently bonding and sealing the casing to the walls, and allowing the cementitious material to set into a hard impermeable mass. A variety of rubber latex compositions can be utilized in accordance with the present invention and generally comprise a pumpable aqueous dispersion or emulsion rubber.

Thus, it is a general object of the present invention to provide improved well completion methods using rubber latex compositions in subterranean formations containing salt zones.

Another object of the present invention is to provide methods for producing substantially impermeable layers of polymer on salt zones whereby the zones are protected from being washed-out by fluids.

Another object of the present invention is to provide a method for the primary bonding of a conduit such as casing within the well bore whereby a permanent bond and seal between the casing and walls of the well bore is maintained even though a protective layer of polymer is applied to the walls prior to the introduction of a cementitious composition between the casing and the layer.

Another object of the present invention is to provide a method for the use of freshwater cement slurries in the primary cementing of conduits such as casing through salt zones of subterranean formations.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of performing well completion operations in one or more subterranean formations containing salt zones or in one or more well bores penetrating such formations whereby an aqueous polymer composition such as rubber latex is introduced into the formations or well bores and a protective layer of polymer is formed on the salt zones. The layer of polymer is substantially impermeable to water-based fluids and prevents such fluids from attacking the salt zones and causing wash-out areas to form therein.

The term "rubber" is used herein to mean hydrocarbon polymers occurring naturally, e.g., natural rubber latex from trees, and any of the synthetic hydrocarbon polymers having properties of elongation or yield under stress and elastic recovery. The terms "well completion methods" or "well completion operations" are used herein to mean any of the operations utilized for completing the preparation of a well for hydrocarbon production after it has been drilled such as the primary bonding of casing and liners in the well bore, placing light weight flotation barriers over caverned liquid hydrocarbons, consolidating gravel packs or incompetent sands in formations and the like.

The methods of the present invention are particularly suitable for providing primary bonding of casing and/or liners disposed in well bores through salt zones. Such primary bonding has heretofore been carried out by pumping a cement slurry downwardly through the casing or liner and then upwardly into the annulus between the external surfaces of the casing or liner and the walls of the well bore. After placement of the cement in the annulus, it is allowed to set into a hard impermeable mass. The cement provides a bond between the casing or liner and the walls of the well bore to thereby maintain the casing or liner in place and prevent communication between zones or formations which are penetrated by the well bore via the annulus.

While the heretofore primary cementing methods utilized have been successful, in some wells and particularly where salt zones are present the use of water-based fluids can cause wash-out areas to form, and therefore, salt saturated drilling fluids and cement slurries are often used for well completion operations through these zones. However, using a salt saturated cement slurry is often undesired because the salt increases the set time of the cement which also increases the amount of time and costs expended on the well completion operations.

The preferred methods of the present invention eliminate the above described problems by depositing a layer of rubber latex on the salt zone to create a substantially impermeable barrier between it and water-based fluids that are introduced into the well bore. That is, in accordance with the methods of the present invention for protecting a salt zone in a well bore, a rubber latex composition is pumped downwardly through the conduit and upwardly into the annulus between the conduit and the well bore. The rubber latex composition is allowed to contact the one or more salt zones which causes the latex to become unbalanced and a layer of polymer to form thereon. Once the layer of polymer has set on the salt zone, the layer is substantially impermeable to water-based fluids. Further, the layer of polymer provides a stable barrier between the salt zone and cementitious slurries introduced into the well bore for cementing the casing therein.

Preferred methods of the present invention for forming a layer of polymer on a salt zone in a well bore or in formations penetrated by the well bore generally comprise the steps of drilling a well bore in a subterranean formation containing a salt zone using a salt saturated drilling fluid, placing a rubber latex composition in the well bore or in formations penetrated by the well bore, contacting the salt zone with the rubber latex composition, allowing the rubber latex composition to react and form a layer of rubber on the salt zone for providing a protective barrier which is substantially impermeable to water-based fluids, placing a hydraulic cementitious slurry in the well bore between casing placed therein and the layer of rubber for permanently bonding and sealing the casing to the walls, and allowing the cementitious material to set into a hard impermeable mass. A variety of rubber latex compositions can be utilized in accordance with the present invention and generally comprise a pumpable aqueous dispersion or emulsion rubber. The term "pumpable" is used herein to mean that the composition has a viscosity and other properties whereby it can be pumped to the location of placement.

As indicated above, a variety of well known rubber materials can be utilized for forming compositions useful in accordance with the present invention. For example, natural rubber (cis-1,4-polyisoprene) in most of its modified types can be utilized. Synthetic polymers of various types can also be used including styrene-butadiene rubber (SBR), cis-1,4-polybutadiene rubber and blends thereof with natural rubber or styrene-butadiene rubber, high styrene resin, butyl rubber, ethylene-propylene rubbers (EPM and EPDM), neoprene rubber, nitrile rubber, cis-/tr 1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber. The rubber materials are commercially available in latex form, i.e., aqueous dispersions or emulsions which are utilized directly. Of the various rubber materials which can be utilized, styrene-butadiene latex is generally preferred.

The rubber latex compositions can be modified to increase or decrease their densities as required by particular applications. For example, if a heavy composition is required, density increasing additives can be included and if a light-weight composition is required, the compositions can be foamed with an inert gas such as nitrogen.

A variety of cementitious materials can be utilized in the well bore between casing placed therein and the layer of rubber for permanently bonding and sealing the casing to the walls. For example, the cementitious material may be any of the various hydraulic cements which are commonly utilized, both normal particle size and fine particle size including those comprised of calcium, aluminum, silicon, oxygen and/or sulfur which set and harden by reaction with water. Examples of some of such hydraulic cements include Portland cements, pozzolan cements, gypsum cements, high aluminum content cements, silica cements and high alkalinity cements.

Portland cements are generally preferred hydraulic cementitious materials for use in accordance with the present invention. Portland cements are classified by the American Society of Testing Materials (ASTM) into five major types identified by the Roman numerals I–V, and by the American Petroleum Institute (API) into eight categories identified by the letters A–H. The classifications are based on chemical composition and physical properties. The API Portland cements are described and identified in the *API Specification For Materials and Testing For Well Cements*, API Specification 10, 21st Edition, dated Sep. 1, 1991 of the American Petroleum Institute, Washington, D.C.

Generally, any particulate cementitious material or combination of materials which in the presence of water will form a hard cementitious mass of sufficient strength and other properties can be utilized. If the cementitious material or combination of materials is self activating, a set retarder may be used to prevent hardening of the material until after it has been placed in the well bore being drilled.

It can readily be seen to one skilled in the art that the methods of the present invention have many advantages. By creating protective layers of polymer on the salt zones wash-out areas are prevented from forming in the subterranean formations. Further, the protective layers enable fresh-water cement slurries to be used in the well completion operations through the salt zones.

Thus, the present invention is well adapted to carry out the objects and attain the ends and advantages mentioned as well as those which are inherent therein. While numerous changes can be made to the presently preferred embodiments of the methods and compositions of the present invention which are described herein, such changes are within the spirit of this invention as defined by the appended claims.

What is claimed is:

1. A method of forming a protective layer on a salt zone in a well bore or in subterranean formations penetrated by the well bore comprising the steps of:

placing an aqueous rubber composition in the well bore or in the subterranean formations;

contacting the salt zone with said rubber composition; and allowing said rubber composition to form a layer of rubber on the salt zone.

2. The method of claim 1 wherein said layer of rubber is substantially impermeable to fluids.

3. The method of claim 1 wherein said aqueous rubber composition comprises natural rubber, a synthetic rubber, or mixtures thereof.

4. The method of claim 1 wherein the rubber in said aqueous rubber composition is selected from the group consisting of natural rubber, styrene-butadiene rubber, cis-1,4-polybutadiene rubber and blends thereof with natural rubber or from the group consisting of styrene-butadiene rubber, high styrene resin, butyl rubber, ethylene-propylene rubbers, neoprene rubber, nitrile rubber, cis-/tr 1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber.

5. The method of claim 1 further comprising the step of:
drilling a well bore in the subterranean formation containing the salt zone using a salt saturated drilling fluid.

6. The method of claim 1 further comprising the steps of:
placing a hydraulic cementitious material in the well bore between casing placed therein and said layer of rubber; and
allowing said hydraulic cementitious material to set into a hard impermeable mass.

7. The method of claim 6 wherein said hydraulic cementitious material is selected from the group consisting of Portland cements, pozzolan cements, gypsum cements, high aluminum content cements, silica cements and high alkalinity cements.

8. A method of forming a protective layer on a salt zone of a subterranean formation comprising the steps of:
drilling a well bore in the subterranean formation containing the salt zone;
placing a rubber latex composition in the well bore or in the subterranean formation penetrated by the well bore;
contacting the salt zone with said rubber latex composition; and
allowing said rubber latex composition to form a layer of-rubber on the salt zone.

9. The method of claim 8 wherein said step of drilling comprises using a salt saturated drilling fluid.

10. The method of claim 8 wherein said layer of rubber is substantially impermeable to fluids.

11. The method of claim 8 wherein said rubber latex composition comprises natural rubber, a synthetic rubber, or mixtures thereof.

12. The method of claim 8 wherein the rubber in said rubber latex composition is selected from the group consisting of natural rubber, styrene-butadiene rubber, cis-1,4-polybutadiene rubber and blends thereof with natural rubber or from the group consisting of styrene-butadiene rubber, high styrene resin, butyl rubber, ethylene-propylene rubbers, neoprene rubber, nitrile rubber, cis-/tr 1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber.

13. The method of claim 8 further comprising the steps of:
placing a hydraulic cementitious material in the well bore between casing placed therein and said layer of rubber; and
allowing said hydraulic cementitious material to set into a hard impermeable mass.

14. The method of claim 13 wherein said hydraulic cementitious material is selected from the group consisting of Portland cements, pozzolan cements, gypsum cements, high aluminum content cements, silica cements and high alkalinity cements.

15. A method of forming a protective layer on a salt zone of a subterranean formation comprising the steps of:
drilling a well bore in the subterranean formation containing the salt zone using a salt saturated drilling fluid;
placing a rubber latex composition in the well bore or in the subterranean formation penetrated by the well bore;
contacting the salt zone with said rubber latex composition;
allowing said rubber latex composition to form a layer of rubber on the salt zone wherein said layer of rubber is substantially impermeable to fluids;
placing a hydraulic cementitious material in the well bore between casing placed therein and said layer of rubber; and
allowing said hydraulic cementitious material to set into a hard impermeable mass.

16. The method of claim 15 wherein said rubber latex composition comprises natural rubber, a synthetic rubber or mixtures thereof.

17. The method of claim 15 wherein the rubber in said rubber latex composition is selected from the group consisting of natural rubber, styrene-butadiene rubber, cis-1,4-polybutadiene rubber and blends thereof with natural rubber or from the group consisting of styrene-butadiene rubber, high styrene resin, butyl rubber, ethylene-propylene rubbers, neoprene rubber, nitrile rubber, cis-/tr 1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber.

18. The method of claim 15 wherein said hydraulic cementitious material is selected from the group consisting of Portland cements, pozzolan cements, gypsum cements, high aluminum content cements, silica cements and high alkalinity cements.

19. A method of protecting a salt zone of a subterranean formation comprising the steps of:
drilling a well bore in the subterranean formation containing the salt zone;
placing a rubber composition in the well bore or in the subterranean formation penetrated by the well bore;
contacting the salt zone with said rubber composition;
allowing said rubber composition to form a layer of rubber on the salt zone;
placing a hydraulic cementitious material in the well bore between casing placed therein and said layer of rubber on the salt zone; and
allowing said hydraulic cementitious material to set into a hard impermeable mass.

20. The method of claim 19 wherein said step of drilling comprises using a salt saturated drilling fluid.

21. The method of claim 19 wherein said layer of rubber on the salt zone is substantially impermeable to fluids.

22. The method of claim 19 wherein said rubber composition comprises natural rubber, a synthetic rubber, or mixtures thereof.

23. The method of claim 19 wherein the rubber in said rubber composition is selected from the group consisting of natural rubber, styrene-butadiene rubber, cis-1,4-polybutadiene rubber and blends thereof with natural rubber or from the group consisting of styrene-butadiene rubber, high styrene resin, butyl rubber, ethylene-propylene rubbers, neoprene rubber, nitrile rubber, cis-/tr 1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber.

24. The method of claim 19 wherein said hydraulic cementitiuus material is selected from the group consisting of Portland cements, pozzolan cements, gypsum cements, high aluminum content cements, silica cements and high alkalinity cements.

* * * * *